(12) United States Patent
Fröhlke et al.

(10) Patent No.: US 10,953,489 B2
(45) Date of Patent: Mar. 23, 2021

(54) FSW TOOL WITH A STATIONARY SHOULDER

(71) Applicant: KUKA Deutschland GmbH, Augsburg (DE)

(72) Inventors: Stefan Fröhlke, Augsburg (DE); Stefan Habersetzer, Rinnenthal (DE); Bernd Richter, Königsbrunn (DE)

(73) Assignee: KUKA Deutschland GmbH, Augsburg (DE)

( * ) Notice: Subject to any disclaimer, the term of this patent is extended or adjusted under 35 U.S.C. 154(b) by 218 days.

(21) Appl. No.: 16/319,204

(22) PCT Filed: Jul. 19, 2017

(86) PCT No.: PCT/EP2017/068222
§ 371 (c)(1),
(2) Date: Jan. 18, 2019

(87) PCT Pub. No.: WO2018/015429
PCT Pub. Date: Jan. 25, 2018

(65) Prior Publication Data
US 2019/0262935 A1 Aug. 29, 2019

(30) Foreign Application Priority Data
Jul. 19, 2016 (DE) .................... 10 2016 113 289.6

(51) Int. Cl.
*B23K 20/12* (2006.01)
*B23K 37/08* (2006.01)
(52) U.S. Cl.
CPC ........ *B23K 20/1245* (2013.01); *B23K 20/122* (2013.01); *B23K 37/08* (2013.01)
(58) Field of Classification Search
CPC ............... B23K 20/122–128; B23K 37/08
(Continued)

(56) References Cited

U.S. PATENT DOCUMENTS 8,006,890 B2 8/2011 Okamoto et al.
8,814,027 B2 8/2014 Hori et al.
(Continued)

FOREIGN PATENT DOCUMENTS

DE 102009024758 A1 2/2010
DE 102012206368 A1 10/2012
(Continued)

OTHER PUBLICATIONS

European Patent Office; Search Report and Written Opinion in related International Patent Application No. PCT/EP2017/068222 dated Oct. 17, 2017; 10 pages.
(Continued)

*Primary Examiner* — Kiley S Stoner
(74) *Attorney, Agent, or Firm* — Dorton & Willis, LLP

(57) ABSTRACT

A set of fittings for an FSW tool (friction-stir-welding tool) includes an adapter that can be inserted into a tool-receiving element and is designed to receive a welding rod, and a shoulder cap that includes a through-opening for the welding rod and the adapter. The shoulder cap includes a welding shoulder region adjacent to the through-opening on the outer surface. The adapter can be rotated in relation to the shoulder cap, about a longitudinal axis extending concentrically to the through-opening. The inner contour of the through-opening and a radial outer contour of the adapter have a conical shape at least on the end facing the welding point. In this way, a conical annular gap is created between the adapter and the shoulder cap, the width of which is adjustable by positioning the adapter along the longitudinal axis.

20 Claims, 4 Drawing Sheets

(58) Field of Classification Search
USPC .............................. 228/112.1–114.5, 2.1–2.3
See application file for complete search history.

(56) References Cited

U.S. PATENT DOCUMENTS

| | | | | |
|---|---|---|---|---|
| 2006/0032887 A1* | 2/2006 | Haynie | ................ | B23K 20/125 |
| | | | | 228/2.1 |
| 2006/0124691 A1 | 6/2006 | Wood et al. | | |
| 2007/0152015 A1* | 7/2007 | Burton | ................ | B23K 20/126 |
| | | | | 228/2.1 |
| 2007/0228104 A1* | 10/2007 | Mankus | ............. | B23K 20/1235 |
| | | | | 228/101 |
| 2008/0006677 A1* | 1/2008 | Kumagai | ........... | B23K 20/1265 |
| | | | | 228/101 |
| 2009/0308913 A1 | 12/2009 | Hall et al. | | |
| 2012/0128445 A1* | 5/2012 | Hotte | ....................... | F16B 11/00 |
| | | | | 411/82 |
| 2012/0267419 A1 | 10/2012 | Blaski et al. | | |
| 2013/0239397 A1* | 9/2013 | Hotte | ................... | B23B 51/101 |
| | | | | 29/525 |
| 2014/0326392 A1* | 11/2014 | Silvanus | ................ | B29C 65/06 |
| | | | | 156/73.5 |
| 2015/0102087 A1 | 4/2015 | Foerg et al. | | |
| 2016/0346869 A1* | 12/2016 | Weigl | ................. | B23K 20/1245 |
| 2017/0080527 A1 | 3/2017 | Weigl | | |

FOREIGN PATENT DOCUMENTS

| | | |
|---|---|---|
| DE | 102012010836 B3 | 6/2013 |
| DE | 102014004331 B3 | 6/2015 |
| WO | 2008082420 A1 | 7/2008 |

OTHER PUBLICATIONS

German Patent Office; Search Report in related German Patent Application No. 10 2016 113 289.6 dated Mar. 17, 2017; 5 pages.
German Patent Office; Second Examination Report in related German Patent Application No. 10 2016 113 289.6 dated Aug. 2, 2019; 5 pages.

* cited by examiner

FSW TOOL WITH A STATIONARY SHOULDER

CROSS-REFERENCE TO RELATED APPLICATIONS

This application is a national phase application under 35 U.S.C. § 371 of International Patent Application No. PCT/EP2017/068222, filed Jul. 19, 2017 (pending), which claims the benefit of priority to German Patent Application No. DE 10 2016 113 289.6, filed Jul. 19, 2016, the disclosures of which are incorporated by reference herein in their entirety.

TECHNICAL FIELD

The present invention relates to a set of fittings for an FSW tool, to an FSW tool equipped with such a set of fittings, as well as a method for adapting an FSW tool for a welding operation and an operating method for an FSW tool.

BACKGROUND

The abbreviation "FSW" is used within the scope of the present disclosure for friction stir welding. Accordingly, an FSW tool is a friction stir welding tool and an FSW process/FSW method is a friction stir welding process/friction stir welding method.

In practice, FSW methods are known in various implementations. They are generally used to bond two components or workpieces to one another made of identical or matching materials. A welding rod set to rotate at the start of a FSW process is placed on the surface of at least one of the components. Due to the friction between the rod and the surface, the material of the at least one component is heated to the point that it plasticizes, i.e., transitions into a pasty state without melting in the process. The welding rod is dipped into in the material of the at least one workpiece, wherein layers situated deeper in the material are also plasticized.

Situated at the dorsal end of the welding rod is a surface protruding in a radial direction, the so-called welding shoulder or shoulder, which comes into contact with the material of the at least one workpiece next to the welding rod when the welding rod is dipped. The shoulder may have the same rotational speed or a different rotational speed in relation to the welding rod. The shoulder may execute a rotational movement in relation to the at least one workpiece or may remain stationary.

The FSW tool with the welding rod dipped into the material and with the welding shoulder resting on the surface is moved along on the workpiece in accordance with a desired welding line or welding path. In the process, continuously more material of the workpiece is plasticized by the welding rod and in some cases moved around the welding rod. During the essentially translational movement, the welding rod shapes the weld seam and, if necessary, also serves to effect a contact pressure on the surface of the at least one workpiece, in particular, essentially perpendicular to the surface or at a slight pitch relative to the normal direction. As a result of the contact pressure and the coverage of the plasticized zone by the welding shoulder, the pasty material fills the entire depth of the weld seam and does not escape in an undesirable direction.

A welding shoulder in the case of friction stir welding is defined as a surface region next to a welding rod, which touches the surface of at least one workpiece during an FSW welding operation in such a way that it comes into contact with the plasticized material. The welding shoulder may execute a rotational movement relative to the workpiece as well as a translational movement along a welding path. Frictional heat, which promotes the plasticization at least in sections, may be generated by the translational movement and/or rotational movement (in general, relative movement) between the welding shoulder and the workpiece. Alternatively, the plasticization may be caused exclusively or largely by the impact of the welding rod.

FSW welding tools are known from U.S. Pat. Nos. 8,006,890 B2 and 8,814,027 B2, in which a gap is cylindrically shaped, in any case at the end facing the welding point, between the rotating and respectively integrally designed welding rod and an adjacent component that forms the welding shoulder.

DE 10 2012 206 368 A1 discloses a friction stir spot welding device for bonding workpieces situated one on top of the other by means of friction stir spot welding (FSSW). A pressure application device having a presser foot is provided on the FSSW welding tool. The presser foot is pressed on the upper workpiece during a spot welding operation, in order to prevent it from lifting off the lower workpiece. An integrally designed, rotating welding tool having a welding rod at the end is dipped into the surface of the upper workpiece by a dipping mechanism. During dipping, the presser foot is pressed into the housing of the FSSW tool against the force of a pre-tensioned component. The presser foot exhibits no movement relative to the workpieces during a welding operation. The contact surfaces of the presser foot are situated outside the welding zone, i.e., they do not come into contact with plasticized material. A welding shoulder is provided solely on the integrally rotating welding tool in a region next to the welding rod.

The present disclosure is directed to an FSW method, in which an essentially purely translational movement of the shoulder of the welding tool takes place relative to the at least one workpiece. These are also referred to as FSW methods with a standing shoulder or with a stationary shoulder. The FSW tool disclosed herein may also be used for FSW methods, in which the welding shoulder and the welding rod are driven at different rotational speeds (between each other or in relation to the workpiece).

It has proven to be problematic with such methods that pasty material may penetrate into a region between the welding rod and the standing shoulder. A rotational mobility between the welding rod and the shoulder is necessary, which is generally associated with a bearing and an annular gap. During the welding operation using currently known FSW tools, portions of the plasticized material may penetrate into this bearing point or into the annular gap and in various ways may result in impairments to the welding operation or in damage to the FSW tool and/or on the workpiece. A plugging of the gap and/or a blockage of the bearing point, in particular, may result which, on the one hand, produces irregularities or discontinuations in the welding operation or flawed weld seams and, on the other hand may result in damage to or in complete destruction of the FSW tool. However, an annular gap cannot be eliminated due to the required relative movement between the welding rod and the welding shoulder.

It is the object of the present invention to demonstrate a set of fittings for an FSW tool, a tool equipped with such a set of fittings and an associated adaptation method for an FSW tool, as well as an operating method for an FSW tool, with which the aforementioned disadvantages may be reduced or eliminated.

SUMMARY

The invention achieves this object with the FSW tool, fittings, and methods as shown and described herein.

An FSW tool in general includes components having a long service life, which may be used over a multitude of welding operations or over the entire service life of the FSW tool without being replaced. The FSW tool also comprises components, which are subject to extreme wear during a welding operation and which therefore have to be repaired or replaced after a certain number of welding operations. The components are referred to below as a set of fittings.

A set of fittings according to the present disclosure comprises an adapter, which is insertable in the tool receiving element of an FSW tool. The adapter is designed to accommodate a welding rod. The set of fittings further comprises a shoulder cap, which forms at least one part of the welding shoulder. A welding rod is an optional component of the set of fittings according to the present disclosure.

The adapter, the welding rod and the shoulder cap may each be repaired or replaced individually or together after a certain number of welding operations. The tool receiving element is replaced in general less frequently or not at all. It may, however, be adapted preferably for accommodating and fastening the adapter and/or the welding rod according to the present disclosure and, for example, to the shape of the shoulder cap. The tool receiving element also constitutes an optional component of the set of fittings according to the present disclosure.

The shoulder cap includes a through-opening for the welding rod and the adapter. It further includes a welding shoulder region adjacent to the through-opening on the outer surface. The welding shoulder region is a distal, i.e., surface region of the shoulder cap facing the welding point, which is physically involved in the welding process.

The welding rod, the adapter and the through-opening in the shoulder cap preferably include a shared reference axis, which is referred to below as a "longitudinal axis". The longitudinal axis extends generally concentrically to the through-opening of the shoulder cap and is also a rotation axis for the rotational movement of the adapter and of the welding rod. In other words, the adapter is mounted rotatable relative to the shoulder cap about a longitudinal axis extending concentrically to the through-opening.

According to the present disclosure, it is provided to conically shape the inner contour of the through-opening as well as a radial outer contour of the adapter, at least at the end facing the welding point, i.e. at the distal end. In this way, an essentially conical annular gap is formed between the shoulder cap and the adapter, in particular, between the aforementioned inner contour and the radial outer contour. The conical shape of the inner contour of the through-opening and, similarly, the conical shape of the outside of the adapter are preferably selected in such a way that they widen toward the inside of the FSW tool, i.e. toward the dorsal side. The opening angle of the two cones may be identically or variously selected, so that internal widths of the annular gap are formed, which taper or expand toward the inside, i.e. toward the dorsal side, or are uniform in cross section.

The conical shape of the annular gap or of the inner contour of the through-opening as well as of the outer contour of the adapter yields various advantages. On the one hand, the internal width of the annual gap is changed with a change of the positioning of the adapter in the direction of the longitudinal axis relative to the welding shoulder region. The opening width of the annual gap increases if the adapter is shifted closer to the dorsal side, i.e. toward the inside of the FSW tool. If, on the other hand, the adapter is shifted more toward the distal side, i.e., more in the direction of the point of engagement of the FSW tool, the internal width of the annual gap decreases. Thus, the positioning of the adapter relative to the shoulder cap makes a controlled adjustment of the internal width of the annular gap corresponding to the opening angle of the conically shaped contours possible. Thus, the width of the annular gap at the distal end (directly on the outer contact zone of the welding point) may be adjusted to a size suitable for the respective welding operation. This was not possible with the previously known cylindrical gaps.

The adapter and the tool receiving element are preferably designed in such a way that a positioning of the adapter in the direction of the longitudinal axis relative to the welding shoulder region is infinitely adjustable, so that as a consequence the internal width of the annular gap is infinitely adjustable.

It is therefore possible to adapt the width of the annular gap to the respective process conditions and, for example, to the materials to be processed and/or to the welding speeds.

In addition, the adapter and/or the welding rod are preferably designed to infinitely adjust a positioning of the welding rod along the longitudinal axis and, therefore, the penetration depth of the rod into the material of the at least one workpiece.

The positioning of the welding rod may be particularly preferably adjusted independently of the adjustment of the positioning of the adapter. It is therefore possible to specify minimal and deep penetration depths for the welding rod, in each case in combination with wide or with narrow gap dimensions, so that the set of fittings, respectively, the FSW tool are flexibly adaptable to any welding tasks. The ideal combination derived from the dimension of the penetration depth of the welding rod and the width of the annular gap may be found in any manner, for example by experimentation, iterative optimization or analytical calculation/modelling.

Additional advantageous embodiments of the invention shall be made apparent from the appended drawings and the description below.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
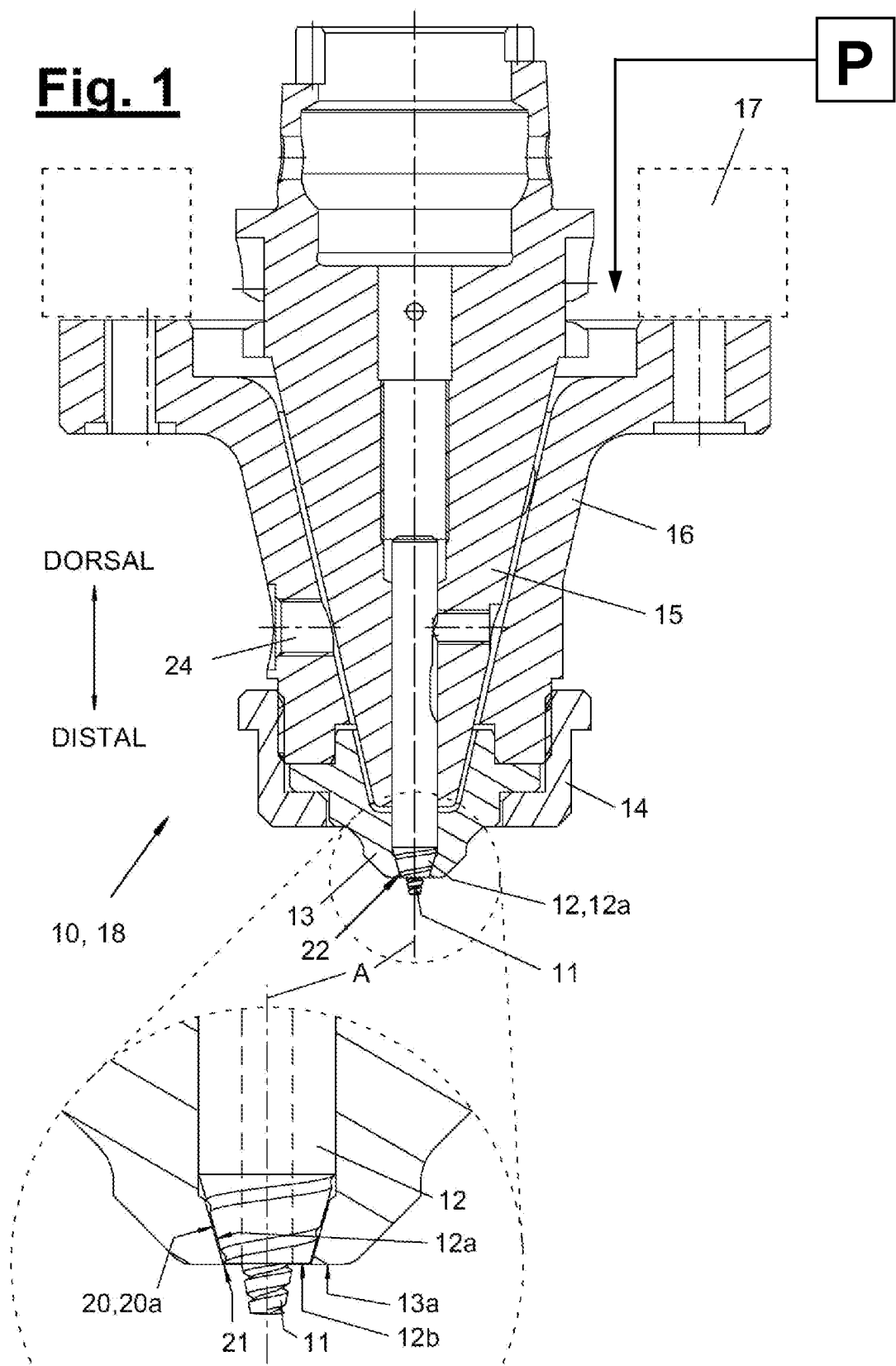
FIG. 1 shows an FSW tool according to the present disclosure in half-section with an enlarged view of the distal end region.
Figure 2:
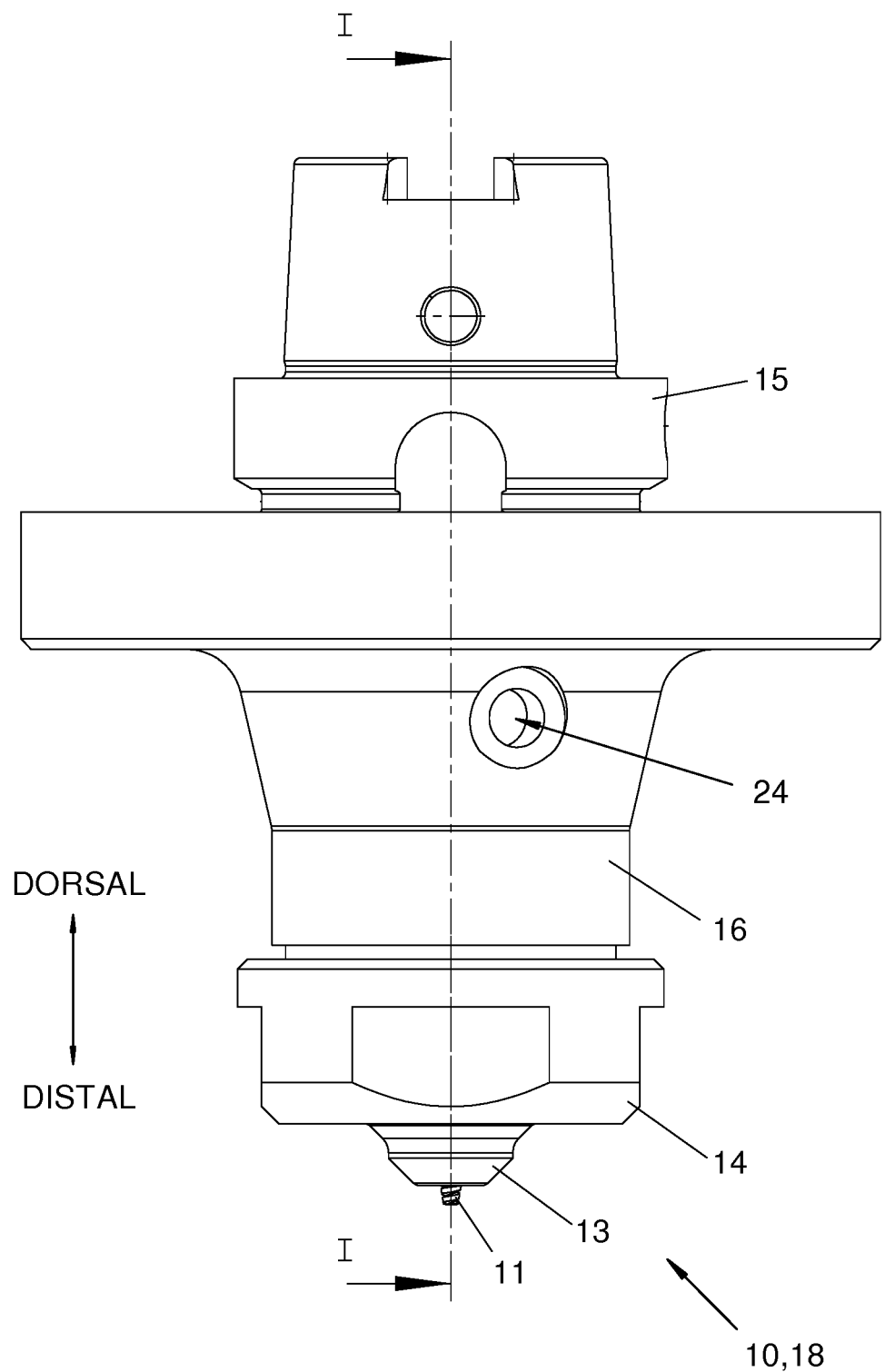
FIG. 2 shows a side view of the FSW tool of FIG. 1.

FIGS. 1 and 2 show an FSW tool (10), including a set of fittings (18) according to the present disclosure. The sectional view in FIG. 1 is selected according to the section line I-I in FIG. 2.

The set of fittings (18) according to the present disclosure comprises at least one adapter (12) and a shoulder cap (13). The adapter (12) is insertable into a correspondingly adapted tool receiving element (15) on the FSW tool (10). A welding rod (11) is insertable in the adapter (12). According to the depictions in FIGS. 5 and 6, a (infinite) positioning (XA) of the adapter (12) as well as a (infinite) positioning (XP) of the welding rod (11) are provided in the direction of a longitudinal axis (A).

In the example shown, the welding rod (11), the adapter (12) and the tool receiving element (15) have a common longitudinal axis (A), about which the aforementioned components are jointly rotationally movable. The drive for the rotational movement may be generated in any manner. The FSW tool (10) may preferably have its own rotary drive. Alternatively or in addition, the tool receiving element (15) may be permanently or detachably connected to an external drive, for example, a spindle.

The FSW tool (10) includes a tool carrier (17), which may be arbitrarily designed. Bearing points are provided on the tool carrier (17) in order accommodate the tool receiving element (15) in a rotatably pivotal manner about the longitudinal axis (A) and supported in the axial direction (A). The FSW tool (10) may further include a dome (16), which encloses an outside of the tool receiving element (15) at least in sections and on which the shoulder cap (13) is fixable in a non-rotatable manner and supported in the axial direction (A). In other words, the FSW tool (17) is designed to accommodate the set of fittings (18) and to support or store it relative to a common reference base.

The FSW tool (10) may be designed as a manipulator-guided FSW tool, which is used in an automated production process. The tool carrier (17) accordingly may include a flange element for connection to a manipulator hand and, for example, to an output axis of the manipulator. The manipulator may be a five-axis, six-axis or seven-axis industrial robot. The manipulator hand may accordingly be a robot hand.

The FSW tool with the set of fittings (18), the dome (16), the tool receiving element (15) and the tool carrier (17) is preferably designed in such a way that the tool receiving element (15) with the adapter (12) is positioned rotatably mounted and on the tool carrier (17) in the direction of longitudinal axis (A) relative to the dome (16), and that the shoulder cap (13) is non-rotatably connected to the tool carrier (17) and is positioned in the direction of the longitudinal axis (A). In this way, the vertical position of the adapter (12) at the distal end of the FSW tool on the one hand may be adjusted in the direction of the longitudinal axis (A), and, on the other hand, the vertical position of the welding rod (11) may be adjusted in the direction of the longitudinal axis (A) relative to the vertical position of the welding shoulder region (13a) on the shoulder cap (13) to a desired degree.

Alternatively or in addition, the vertical position of the shoulder cap (13) may be adjustable in the longitudinal direction (A) relative to the tool carrier (17) and/or relative to the dome (16), for example, by inserting shims or other conventional design variants.

The shoulder cap (13) in the examples shown, is an essentially rotationally symmetrical component, which is insertable at the distal end of the dome (16) in a correspondingly adapted holder. An anti-torsion device may optionally be provided on the shoulder cap (13) and/or on the dome (16), via which reaction forces from the welding process relative to the dome (16) are supportable.

In the example shown, the shoulder cap (13) is affixed to the dome (16) by a cap nut (14). The cap nut or another suitable fastening means for the shoulder cap (13) may also include an anti-rotation device.

According to one alternative embodiment variant (not shown) the shoulder cap (13) and the cap nut (14) may be integrally connected. In other words, the shoulder cap (13) may be affixed directly to the dome (16) via a thread or another suitable construction means.

However, a shoulder cap (13) and cap nut (14) designed separately has various advantages. The shoulder cap (13) is regularly repaired or replaced due to wear. The functional separation of shoulder cap (13) and cap nut (14) allows for a simpler and, therefore, less expensive design of the shoulder cap (13). Furthermore, the materials of the shoulder cap (13) and, in particular, of the welding shoulder region (13a) on the one hand, and the materials of the cap nut (14) on the other hand, in particular, of the fastening means (in this case a thread), may be specified independently of one another. It is therefore possible to provide shoulder caps (13) made of various materials for different welding requirements, each of which is securable on the FSW tool (10) with the same cap nut or with only few variants of a cap nut (14).

An enlarged depiction of the distal end of the FSW tool (10) is shown in the lower section of FIG. 1. During a welding operation, the welding rod (11) and the adapter (12) are preferably set in joint rotation, in particular, by driving the tool receiving element (15). Furthermore, the shoulder cap (13) with the welding shoulder region (13a) is moved not rotationally in relation to the workpiece during the welding operation, but only (together with the FSW tool) essentially along the designated welding path, which in general generates a purely translational relative movement between the welding shoulder and the workpiece. Thus, in the enlarged depiction according to FIG. 1, the welding rod (11) and the distal end face (12b) move at a first rotational speed and the welding shoulder region (13a) moves at a second rotational speed, which may be zero in relation to the workpiece. Rotations of the entire FSW tool (10), which result, for example, from the guiding movement or from the welding path, may also result in a slight rotation of the welding shoulder region (13a) in an embodiment variant with the stationary shoulder relative to the at least one workpiece, which is not considered to be a relevant rotation.

Situated between the distal end face (12b) and the welding shoulder region (13a) is a gap, in particular, an annular gap (21), in order to enable the relative rotation between the welding rod (11) and the adapter (12) on the one hand, as well as the shoulder cap (13) on the other hand. The annular gap is delimited outwardly in the radial direction by an inner contour (20a) of the through-opening (20) on the shoulder cap (13). The annular gap (21) is delimited inwardly in the radial direction by a radial outer contour (12a) of the adapter (12). The annular gap (21) is designed preferably so as to be rotationally symmetrical to the longitudinal axis (A).

The inner contour (20a) of the through-opening (20) and the radial outer contour (12a) of the adapter (12) are conically shaped at least at the distal end. The conical shape preferably extends over the entire length of the covering between the inner contour (20a) and the outer contour (12a).

The average diameter of the annular gap (21) increases preferably in the dorsal direction along the longitudinal axis (A). In other words, the average diameter of the annular gap (21) is smaller at the distal end than at the dorsal end. The internal width (D) (compare FIG. 6) is therefore uniform over the entire length of the annular gap (21) or increases in the dorsal direction. According to one alternative variant, the average diameter of the annular gap (21) may diminish in the dorsal direction along the longitudinal axis (A).

According to one embodiment variant (cf. FIG. 6), the opening angle (W) of the conical inner contour (20a) is between 10 degrees and 45 degrees (angular degree). Furthermore, the opening angle (W) of the conical radial outer contour (12a) of the adapter (12) may be between 10 degrees and 45 degrees (angular degree) relative to the longitudinal axis (A). In other words, the opening angle (W) of the conical contour (20a) and the conical radial outer contour (12a) may be dimensioned the same. Alternatively, the opening angles may be slightly different. It may be provided, in particular, that the opening angle of the inner contour (20a) is selected to be somewhat larger than the opening angle of the conical radial outer contour (12a), so that the internal width (D) of the annular gap (21) increases in the dorsal direction along the longitudinal axis (A).

A positioning (XA) of the adapter (12) and/or of the welding rod (11) along the longitudinal axis (A) relative to the shoulder cap (13) results in an increase or a decrease of the internal width (D) of the annular gap. The positioning (XA) may take place using arbitrary means and design elements. One or multiple adjustment means are preferably situated on the tool receiving element (15) for establishing the axial position of the adapter (12) and/or of the welding rod (11). These adjustment means may be designed, in particular, as adjustable stops and/or as clamping devices. According to the examples in FIGS. 3 and 4, the adjustment means are designed as one or multiple clamp screws (not shown), which are insertable in the radial direction into the tool receiving element (15).

Figure 3:
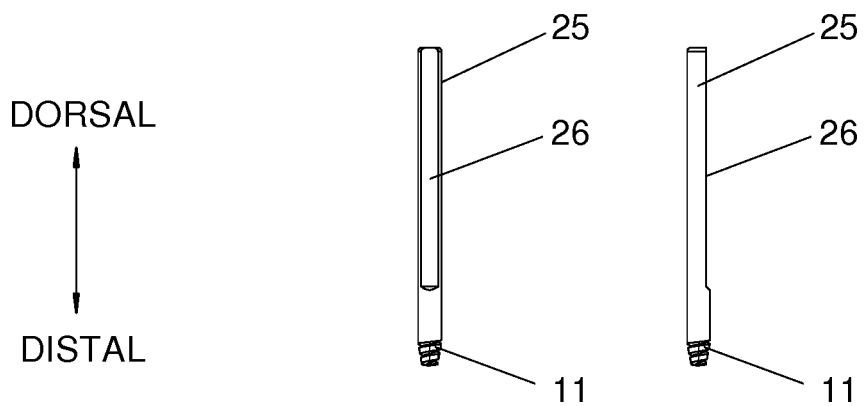
FIG. 3 shows a welding rod in a front view and a side view.
Figure 4:
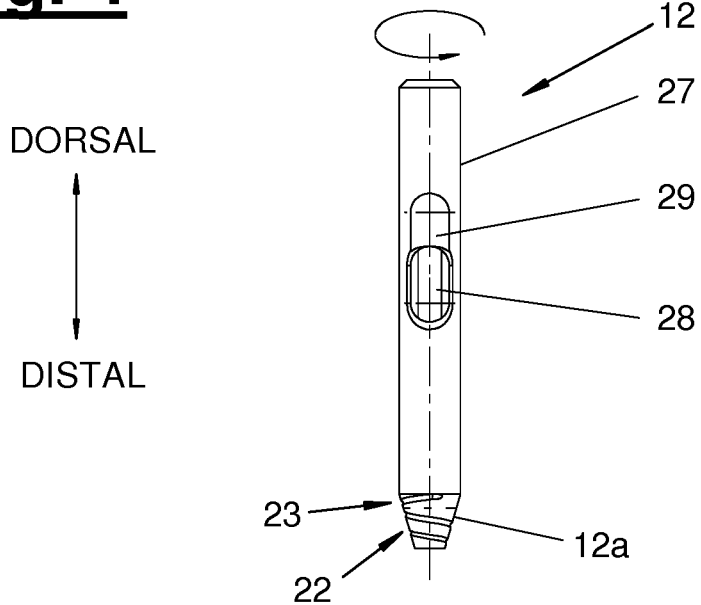
FIG. 4 shows an adapter for accommodating a welding rod.

FIGS. 3 and 4 show exemplary embodiments of a welding rod (11) and of an adapter (12). The welding rod (11) and the adapter (12) may each include a shaft (25, 27), which is preferably rotationally symmetrically/cylindrically shaped. This shaft (25, 27) may be provided with one or multiple flat sections (26, 29), which cooperate with aforementioned adjustment means, in particular, for producing a clamp connection. The aforementioned one or multiple clamp screws or other suitable fastening means, which cooperate with the flat sections (26, 29), may be situated on the tool receiving element (15). The adapter (12) in the example of FIG. 4 includes a lateral opening (28), through which a clamp screw or another suitable adjustment means may engage in order to come into contact with the flat section (16) on the welding rod (11).

According to another design variant (not shown), movable stops or set screws situated in the direction of the longitudinal axis (A) may be provided on the tool receiving element (15) and/or on the adapter (12), in order to set the positioning (XA) of the adapter (12) and/or the positioning (XP) of the welding rod (11) along the longitudinal axis (A).

Figure 5:
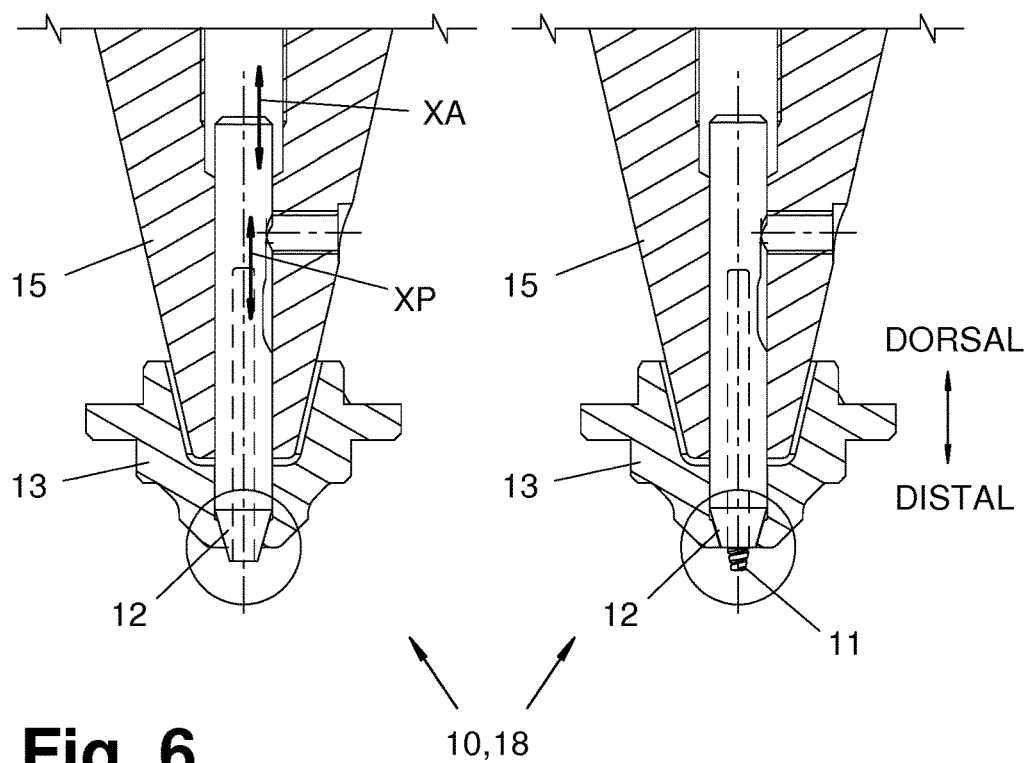
FIGS. 5 and 6 are comparison views for explaining the positioning of the adapter and of a welding rod in the longitudinal direction and for adapting the FSW tool for a welding process.
Figure 6:
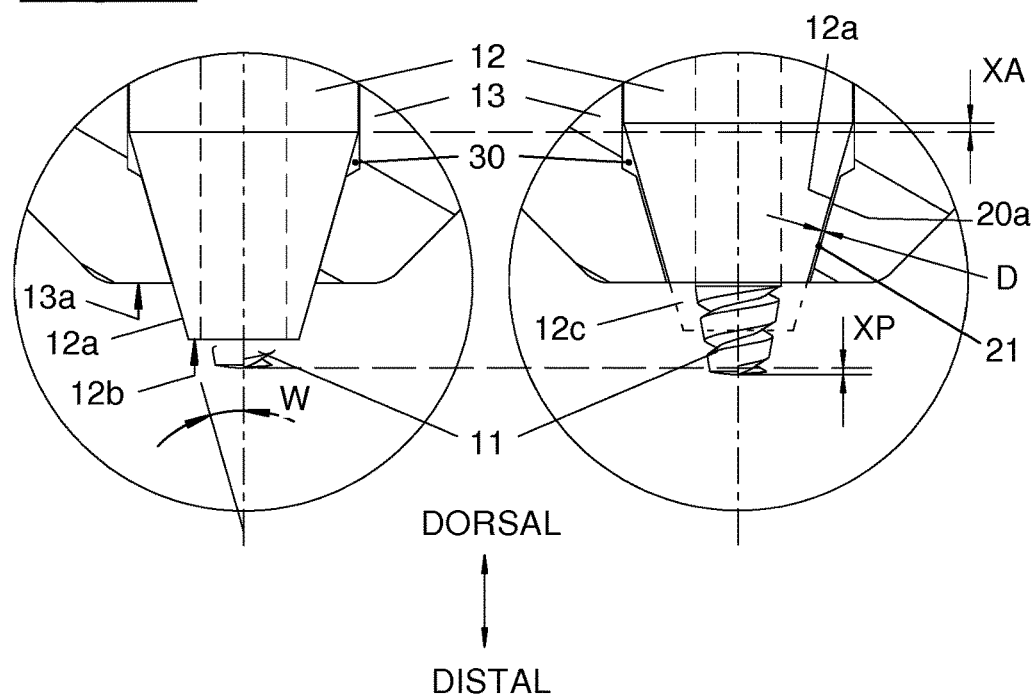

According to a first embodiment variant, the conical radial outer contour (12a) of the adapter (12) and the conical inner contour (20a) of the shoulder cap (13) may be designed essentially smooth, i.e., may form a regular cone surface (cf. FIGS. 5 and 6).

According to one design variant and depicted in FIGS. 1 and 4, a (first) guide structure (22) may be situated on the conical radial outer contour (12a) of the adapter (12), which generates a conveying force on a material located in the annular gap (21) in the direction of the longitudinal axis (A) during a relative rotation between the adapter (12) and the shoulder cap (13).

Alternatively or in addition to the embodiment of a (first) guide structure (22) on the radial conical outer surface (12a) of the adapter (12), a corresponding (first) guide structure may be situated on the inner contour (20a) of the through-opening (20) (not depicted).

The (first) guide structure (22) according to one embodiment variant, may be designed in such a way that it generates a conveying force in the direction of the outside of the FSW tool, i.e., in the distal direction. In such a case, this causes material which, for example, penetrates into the annular gap (21) during a welding operation, to be expelled through the guide structure (22). In other words, a self-cleaning function for the annular gap (21) is created, in which material is conveyed from the gap back in the direction of the welding point. In FIG. 4, a rotational direction designated for the rotation of the adapter (12) relative to the shoulder cap (13) for generating a conveying force in the distal direction is marked by a rotation arrow.

According to a second embodiment variant, the (first) guide structure (22) may be designed to generate a conveying force in the direction of the inside of the FSW tool, i.e., in the dorsal direction. This also generates a self-cleaning of the annular gap (21), wherein the material is discharged to the inside, however. Accordingly, it is advantageous if in the mounted state of the set of fittings, a chamber (30) is situated at the inner end of the annular gap (21) (cf. FIG. 6), which is designed to receive welding material passing through the annular gap (21).

Which of the aforementioned design variants is to be preferred may depend on the respective welding process, in particular, on the material of the workpiece to be welded.

In FIG. 4, an embodiment variant is depicted, in which the aforementioned first guide structure (22) and, in addition, a second (inner/dorsal) guide structure (23) are situated on the conically radial outer contour (12a) of the adapter (12). The second guide structure (23) is located closer to the inside of the FSW tool in the longitudinal direction (A), i.e., at the dorsal end of the conically radial outer contour (12a). The first and the second guide structures (22, 23) are aligned opposite one another. The first guide structure (22) may particularly preferably generate a conveying force in the distal direction, i.e., toward the outside of the FSW tool, whereas the second guide contour (23) generates a conveying force in the dorsal direction, i.e., toward the inside of the FSW tool.

Thus, the first guide structure serves to counteract a penetration of pasty material into the annular gap (21) or to convey material that has entered back toward the welding point. If, however, by overcoming the first conveying force, an excessive amount of material enters the annular gap, an emptying is caused by the second guide structure toward the inside, in particular, in the direction of the aforementioned chamber (30). Because of the size ratios between the first and the second guide contour (22, 23) and their characteristic shapes, it is possible to adapt the conveying effects in the distal and dorsal direction in accordance with the process requirements.

The aforementioned guide structures (22, 23) may be arbitrarily designed. The figures depict, for example, a spiral or thread-like recess in the conical radial outer contour (12a) for forming a guide structure (22, 23). Alternatively, a differently shaped coil embedded or superimposed in the surface, superimposed blade surfaces or other suitable contours may be utilized.

A cleaning effect for the annular gap (21) may be achieved alternatively or in addition by other measures. In particular, a pressure differential may be generated between the inner or dorsal opening and the outer or distal opening of the annular gap (21), which generates as needed a conveying effect in the distal or dorsal direction on a material located in the annular gap (21). For this purpose, the FSW tool may be designed pressure-tight in relation to the annular gap (21) and may include a pressure source. The pressure source may preferably be controllable or regulatable.

According to one embodiment variant, the shoulder cap (13) encases the distal end section of the tool receiving element (15) in a pressure-tight manner. In addition, the shoulder cap (13) and the dome (16) may jointly encase the tool receiving element (15) in a pressure-tight manner. In this way, a fluid passage or pressure supply passage is formed in the space between the shoulder cap (13) and the dome (16) on the one hand, and between the tool receiving element (15) and the adapter (12) on the other hand, which may be acted upon with pressure. The FSW tool (10) may include a pressure source, in particular, an over-pressure source, preferably at the dorsal end. When a pressure, in particular, an over-pressure, is generated in the fluid passage, material located in the annular gap (21) is impacted by an outwardly directed (to distal) conveying force. The over-pressure force may be controlled or regulated in order to establish a balance between the reaction forces from the welding operation, by which a material is transported into the annular gap (21) on the one hand, and the conveying forces serving to clean the conveying gap in the distal direction on the other hand. The pressure source may alternatively or in addition, be designed to generate an under-pressure. Similarly, the material potentially located in the annular gap may be impacted by a conveying force, which draws the material inwardly, i.e., acts in the dorsal direction for cleaning.

The generation of an over-pressure may be utilized during a welding operation in order to reduce or avoid the penetration of pasty material into the annular gap. The generation of an under-pressure may be utilized after a welding operation in order to suction any material present in the annular gap inwardly. Over-pressure and under-pressure may optionally be alternately generated in order to generate a conveying force alternating in direction (inwardly/outwardly). An alternating conveying force may be helpful in order to dissolve already hardening material components.

An operating method for an FSW tool having a pressure source for carrying out a welding operation comprises the following steps:

Positioning the FSW tool (10) on at least one workpiece, so that the welding rod (11) contacts the workpiece surface. Executing a dipping movement along the longitudinal axis (A) of the welding rod (11), until the auxiliary shoulder (12b) on the adapter (12) and/or the welding shoulder region (13a) of the shoulder cap (13) contacts or contact the workpiece surface. During and after the dipping movement, a portion of the material of the at least one workpiece is plasticized. The plasticization may be promoted by the contact between the welding shoulder region (13a) and workpiece and/or between the auxiliary shoulder (12b) and the workpiece.

During (at least) one welding operation and/or after a welding operation, the pressure source of the FSW tool (10) is actuated in order to generate a pressure within the FSW tool (10) and to impact a plasticized material possibly located in the annular gap (21) with a conveying force. The conveying force may be directed inwardly (dorsally) or may be directed outwardly (distally). Alternatively, the direction of the conveying force may alternate. During a welding operation, the FSW tool (10) is guided by an essentially translational movement along a designated welding path. In the process, the plasticized material is shaped by the auxiliary shoulder (12b) and/or by the welding shoulder region (13a), in particular, for forming a desired seam configuration or seam surface.

The dome (16) may include one or multiple openings (24) situated transversely to the longitudinal axis (A), through which the one or multiple adjustment means for setting the axial position (XA, XP) of the adapter (12) and/or of the welding rod (12) are accessible. In a pressure-tight design of the dome (16), corresponding sealing caps may be provided for these openings (24).

An exemplary method for adapting the FSW tool (10), respectively, a set of fittings (18) for a welding operation, respectively, welding method is explained below with reference to FIGS. 5 and 6.

The adapter (12) according to the FIGS. 5 and 6 may include a distal excess length in the embodiment depicted to the left, so that in the basic state, it projects beyond the vertical position of the welding shoulder region (13a) in the distal direction along the longitudinal axis (A). When the adapter (12) is moved maximally in the distal direction along the longitudinal axis (A) until the conical radial outer contour (12a) comes into contact with the inner contour (20a) of the through-opening (20), the end face (12b) of the adapter (12) may therefore project beyond the welding shoulder region (13a) in the distal direction. In this position, the internal width (D) of the annular gap (21) is reduced to a minimum, in particular, equal to zero. The position (XA) of the adapter (12) may be set relative to the position of the shoulder cap (13) in the longitudinal direction (A) or relative to this initial position in such a way that the internal width (D) of the annular gap (21) is set to a desired degree, in particular, by moving the adapter (12) along the longitudinal axis (A) in the dorsal direction relative to the aforementioned initial position.

It is apparent in the transition from the left depiction to the right depiction in FIG. 6, that the internal width (D) of the annular gap (21) produced is set according to the opening angle (W) of the conically radial outer contour (12a) and/or according to the inner contour (20a), as well as to the offset width (XA) of the adapter (12).

Once the desired internal width (D) of the annular gap (21) is attained, the adapter (12) is set by the adjustment means relative to the shoulder cap (13) in the longitudinal direction (A), in particular, clamped and/or supported on a stop. The overhang of the adapter (12) at the distal end may then be shortened.

In the depiction to the right in FIG. 6, a shortening (12c) of the adapter (12) by such a degree is depicted by way of example, such that the vertical position of the end face (12b) of the adapter (12) is adapted to the vertical position of the welding shoulder region (13a) in the direction of the longitudinal axis (A). In other words, the adapter (12) is shortened in order to adjust a difference in vertical position between the end face (12b) and the welding shoulder region (13a) to a desired degree. Alternatively or in addition, the shoulder cap (13) may be shortened at least in the area of the welding shoulder region (13a), in order to adjust a difference in vertical position between the end face (12b) and the welding shoulder region (13a) to a desired degree. Similarly, an adapter (12) may be provided with no aforementioned overhang.

It is also possible to shorten the end face (12b) of the adapter (12) separately or together with the welding shoulder region (13a) in the direction of the longitudinal axis (A) (not depicted). The shortening may take place, in particular, in such a way that a uniform height of the welding shoulder region (13a) and the end face (12b) of the adapter (12) is produced in the direction of the longitudinal axis (A). Alternatively or in addition, a shortening may take place in such a way that the surface dimensions of the welding shoulder region (13a) and/or of the end face (12b) are adjusted to a desired degree or to a desired surface ratio.

The shortening of the adapter (12) and/or of the shoulder cap (13) may be achieved in any manner, in particular, by a machining method, such as milling, turning or grinding. A filler material may optionally be introduced into the annular gap (21) for the duration of the shortening, in order to prevent chips or other undesirable foreign particles from penetrating into the annular gap (21) during shortening.

Various modifications of the invention are possible. The shoulder cap (13) may include one or multiple openings or recesses, through which material conveyed, for example, to the inside of the FSW tool (10) may escape outwardly again. The shoulder cap (13) may, in particular, be in the shape of a bracket or perforated disk. The welding rod (11) may be arbitrarily designed. It may be, in particular, a standardized standard tool.

A set of fittings (18) for an FSW tool (10), in addition to the shoulder cap (13) and the adapter (12), may comprise one or multiple welding rods (11) as well as, optionally, one or multiple tool receiving elements (15) and adjustment means for setting the position of the adapter (12) and/or the welding rods (11). The dome (16) may be integrally connected to the tool carrier (17).

The distal end face (12a) of the adapter (12) may serves as an auxiliary shoulder. In general, it is moved with the same rotational movement as the welding rod (11). The size (area) of the auxiliary shoulder may be adjusted to a desired degree by shortening the adapter (12) or its overhang, specifically independently of the adjustment of the internal width (D) of the annular gap (21) and of the penetration depth of the welding rod (11).

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE NUMERALS

10 FSW tool
11 welding pin/welding rod/welding probe—rotating
12 adapter—rotating
12a conical radial outer contour
12b end face/auxiliary shoulder
12c shortening
13 shoulder cap—stationary
13a welding shoulder region
14 fastening means/nut
15 tool receiving element
16 dome/bell
17 tool carrier
18 set of fittings
20 through-opening
20a inner contour
21 gap/annular gap
22 first (outer) guide structure
23 second (inner) guide structure
24 opening
25 shaft
26 flat section
27 shaft
28 opening
29 flat section
30 chamber
A longitudinal axis
D gap width
W opening angle/conical angle
XA position of the adapter
XP position of the welding rod

What is claimed is:

1. A set of fittings for a friction stir welding (FSW) tool, comprising:
   an adapter insertable in a tool holder that is configured to accommodate a welding rod; and
   a shoulder cap having a through-opening at a distal end thereof such that the welding rod and the adapter extend through the through-opening;
   wherein the shoulder cap includes a welding shoulder region adjacent to the through-opening;
   wherein the adapter is rotatable relative to the shoulder cap about a longitudinal axis extending concentrically with the through-opening; and
   wherein an inner contour of the through-opening and a radial outer contour of the adapter are conically shaped at least at an end facing a welding point.

2. The set of fittings of claim 1, wherein the adapter and the tool holder are configured such that a position of the adapter is adjustable relative to the welding shoulder region in directions parallel to the longitudinal axis.

3. The set of fittings of claim 1, wherein the adapter is configured such that a position of the welding rod is adjustable along the longitudinal axis.

4. The set of fittings of claim 1, further comprising an annular gap between the shoulder cap and the adapter, at least in the region of the through-opening.

5. The set of fittings of claim 4, further comprising:
   a first guide structure situated on at least one of the conical radial outer contour of the adapter or the inner contour of the through-opening;
   wherein the first guide structure is configured to generate a conveying force in the direction of the longitudinal axis on a material located in the annular gap during a relative rotation between the adapter and the shoulder cap.

6. The set of fittings of claim 5, further comprising:
   a second, inner guide structure situated on at least one of the conical radial outer contour of the adapter or the inner contour of the through-opening;
   the second guide structure located closer to the inside of the FSW tool in the longitudinal direction;
   wherein:
   the first guide structure is configured to generate a conveying force in a direction toward an outside of the FSW tool during the relative rotation, and
   the second guide structure is configured to generate a conveying force in a direction toward an inside of the FSW tool during the relative rotation.

7. The set of fittings of claim 4, further comprising a chamber disposed at an inner end of the annular gap in an assembled state of the set of fittings, the chamber configured to receive welding material passing through the annular gap.

8. The set of fittings of claim 1, further comprising:
at least one adjustment means disposed on at least one of the tool holder or the adapter;
the at least one adjustment means configured to set the axial position of at least one of the adapter or the welding rod.

9. A friction stir welding (FSW) tool, comprising:
a set of fittings according to claim 1;
a dome that encloses the tool holder; and
a tool carrier on which at least one of the tool holder or the dome are supported;
wherein the tool holder is rotatably mounted relative to the dome and is supported on the tool carrier in the direction of the longitudinal axis; and
the shoulder cap is non-rotatably connected to the tool carrier and is supported in the direction of the longitudinal axis.

10. The FSW tool of claim 9, wherein the tool carrier is configured to be fastened to a multiaxial industrial robot.

11. The FSW tool of claim 9, wherein the shoulder cap is connected to the dome by a separate fastener.

12. The FSW tool of claim 9, further comprising:
at least one opening through the dome and extending transverse to the longitudinal axis;
the at least one opening configured to receive at least one adjustment means for setting at least one of the axial position of the adapter or the axial position of the welding rod.

13. The FSW tool of claim 9, wherein:
the shoulder cap and the dome enclose the tool holder in a pressure-tight manner; and
the FSW tool further includes a pressure source operable to generate pressure within the FSW tool such that a material located in the annular gap is impacted by one of an outwardly directed or an inwardly directed conveying force.

14. A method for adapting a set of fittings or an FSW tool for a welding operation, the method comprising:
obtaining a set of fittings, comprising:
an adapter insertable in a tool holder that is configured to accommodate a welding rod, and
a shoulder cap having a through-opening at a distal end thereof such that the welding rod and the adapter extend through the through-opening,
wherein the shoulder cap includes a welding shoulder region adjacent to the through-opening,
wherein the adapter is rotatable relative to the shoulder cap about a longitudinal axis extending concentrically to the through-opening, and
wherein an inner contour of the through-opening and a radial outer contour of the adapter are conically shaped at least at an end facing a welding point; and
setting a position of the adapter in a direction parallel to the longitudinal axis relative to the position of the shoulder cap to thereby adjust an internal width of an annular gap between the shoulder cap and the adapter.

15. The method of claim 14, further comprising:
shortening at least one of the adapter or the shoulder cap in the area of the welding shoulder region to thereby adjust a difference in vertical position between an end face of the adapter and the welding shoulder region to a desired degree.

16. The method of claim 15, wherein the end face of the adapter and the welding shoulder region are shortened in a direction parallel to the longitudinal axis such that at least one of:
a uniform height of the welding shoulder region and the end face of the adapter is produced in the direction of the longitudinal axis; or
surface dimensions of at least one of the welding shoulder region or the end face are adjusted to a desired degree.

17. A method of operating an FSW tool, the method comprising:
obtaining an FSW tool according to claim 13;
positioning the FSW tool on at least one workpiece such that the welding rod contacts a surface of the workpiece;
executing a dipping movement along the longitudinal axis of the welding rod until at least one of an auxiliary shoulder on the adapter or the welding shoulder region of the shoulder cap contacts the workpiece surface, whereby a portion of the material of the workpiece is plasticized; and
actuating the pressure source of the FSW tool during or after the welding operation to generate a pressure within the FSW tool and to impact any plasticized material located in the annular gap with a conveying force.

18. The method of claim 17, further comprising:
guiding the FSW tool during a welding operation in a substantially translational movement along a designated welding path.

19. The method of claim 18, further comprising shaping the plasticized material with at least one of the auxiliary shoulder or the welding shoulder region during the guided movement.

20. A set of fittings for a friction stir welding (FSW) tool, comprising:
an adapter insertable in a tool holder that is configured to accommodate a welding rod; and
a shoulder cap having a through-opening for the welding rod and the adapter;
wherein the shoulder cap includes a welding shoulder region adjacent to the through-opening;
wherein the adapter is rotatable relative to the shoulder cap about a longitudinal axis extending concentrically with the through-opening;
wherein an inner contour of the through-opening and a radial outer contour of the adapter are conically shaped at least at an end facing a welding point; and
wherein at least one of the adapter or shoulder cap is adjustable to thereby adjust a difference in vertical position between an end face of the adapter and the welding shoulder region to a desired degree.

* * * * *